United States Patent [19]
Tremoulet, Jr. et al.

[11] Patent Number: 5,564,469
[45] Date of Patent: Oct. 15, 1996

[54] EROSION RESISTANT HIGH PRESSURE RELIEF VALVE

[75] Inventors: Olivier L. Tremoulet, Jr., Edmonds; Chidambaram Raghavan; Edmund Y. Ting, both of Kent; Glenn Erichsen, Everett, all of Wash.

[73] Assignee: Flow International Corporation, Kent, Wash.

[21] Appl. No.: 365,512

[22] Filed: Dec. 28, 1994

Related U.S. Application Data

[63] Continuation-in-part of Ser. No. 216,689, Mar. 23, 1994, abandoned.

[51] Int. Cl.⁶ .................................................. F16K 15/02
[52] U.S. Cl. ................................. 137/540; 251/333
[58] Field of Search ............................. 137/540; 251/333

[56] References Cited

U.S. PATENT DOCUMENTS

| | | | |
|---|---|---|---|
| 1,443,675 | 1/1923 | Bowler | 137/540 |
| 2,059,759 | 11/1936 | Stearns | 137/540 X |
| 2,429,578 | 10/1947 | Gleasman | 251/540 X |
| 3,550,617 | 12/1970 | Johnson | 137/540 X |
| 4,350,179 | 9/1982 | Bunn et al. | 137/540 X |
| 4,620,562 | 11/1986 | Pacht | 137/528 X |

FOREIGN PATENT DOCUMENTS

| | | |
|---|---|---|
| 368391 | 3/1929 | Belgium . |
| 1057367 | 5/1952 | France . |
| 3538307A1 | 10/1984 | Germany . |
| 58-221081 | 12/1983 | Japan . |
| 5333941 | 12/1993 | Japan . |

*Primary Examiner*—John Rivell
*Attorney, Agent, or Firm*—Seed and Berry LLP

[57] ABSTRACT

A high pressure relief valve for use in a high pressure fluid pump is shown and described. In a preferred embodiment, a valve seat is provided with a tapered hole and with a conduit, the tapered hole and conduit being in fluid communication with each other and with fluid having a variable pressure. A tapered pin having grooves is held in the tapered hole by a control force, or control pressure acting through a plunger. When the pressure of the fluid is sufficiently high to overcome the control force or pressure, the tapered pin is forced to move sufficiently to create an annular clearance between the tapered pin and the tapered hole, thereby allowing pressurized fluid to flow past the pin to an outlet. An outer surface of the valve seat in a region of the tapered pin is tapered in an opposite direction to that of the tapered hole, thereby weakening the valve seat in that region, such that the tapered hole is able to expand and contract as the pressure of the fluid increases and decreases.

25 Claims, 5 Drawing Sheets

EROSION RESISTANT HIGH PRESSURE RELIEF VALVE

CROSS REFERENCE TO RELATED APPLICATION

This application is a continuation-in-part of U.S. patent application Ser. No. 08/216,689, filed Mar. 23, 1994 now abandoned.

TECHNICAL FIELD

This invention relates to relief valves, and more particularly, to an erosion resistant relief valve for use in high pressure fluid pump.

BACKGROUND OF THE INVENTION

Numerous tasks, for example, cutting sheet metal or abrading a surface, may be accomplished through the use of a stream of pressurized fluid, typically water, which is generated by high pressure, positive displacement pumps. (The term "high pressure" used throughout this application refers to any pressure above 10,000 pounds per square inch (psi), including up to and beyond 60,000 psi). Such pumps pressurize a fluid by having a reciprocating plunger that draws the fluid from an inlet area into a pressurization chamber during an intake stroke, and acts against the fluid during a pumping stroke, thereby forcing pressurized fluid to pass from the pressurization chamber to an outlet chamber where it is collected to be used by an operator via whatever tool has been attached to the pump for a particular task.

During the normal course of operation, the required flow rate will vary from the maximum the pump can supply to zero, for example, when the operator turns the tool off. In this situation, where the pressurized fluid is not being used, the pressure in the outlet chamber will build up beyond an acceptable level unless some form of pressure control is incorporated into the pump. If no pressure control is provided, the buildup of high pressure will result in damage and stress to the parts of the pump and undesirable surges of pressure will occur when the operator again turns the tool on.

One method of pressure control which is currently used is to incorporate a relief valve into the pump. When the pressure in the outlet chamber rises above a preset limit as a result of pressurizing more water than is demanded by the end user, the relief valve opens to vent the excess pressurized fluid. A relief valve may be direct acting, meaning that pressurized fluid acts directly to open a poppet that is being held in a closed position by a control force, such as a spring. Currently available direct acting relief valves for high pressure pumps typically last approximately 100 hours, their useful life being limited by severe erosion, which ultimately destroys the sealing ability of the valve. Various attempts have been made to engineer materials that will withstand the destructive effects of normal operating conditions; however, as the operating pressures of high pressure pumps have risen, these materials have failed to increase the useful life of the valves.

SUMMARY OF THE INVENTION

It is therefore an object of this invention to provide an improved high pressure relief valve for use in a high pressure pump that will resist erosion.

It is another object of this invention to provide a high pressure relief valve that is simple to manufacture and maintain.

These and other objects of the invention, as will be apparent herein, are accomplished by providing an improved high pressure relief valve. In a preferred embodiment, a valve seat is provided with a tapered hole and with a conduit, the tapered hole and the conduit being in fluid communication with each other and with a fluid that is pressurized by a high pressure pump, the pressure of the fluid varying with the operating conditions of the pump. A tapered pin is provided in the tapered hole, the tapered pin being in communication with a control force or control pressure, and with the fluid. When the pressure of the fluid rises sufficiently to overcome the control force or control pressure, the pressurized fluid forces the tapered pin to move in the direction of the fluid flow sufficiently to create an annular clearance between the tapered pin and the tapered hole, thereby allowing pressurized fluid to pass through the tapered hole to an outlet. In a preferred embodiment, grooves are provided on the pin to ensure that the flow past. The pin remains turbulent, thereby minimizing the change in pressure that will occur corresponding to a change in the rate of flow of fluid past the pin. In an alternative embodiment, the hole and pin are long and straight.

In a preferred embodiment, an outer surface of the valve seat is contoured to keep the stress along the tapered hole substantially constant with a linear change in pressure. More specifically, the outer surface of the valve seat in a region of the tapered hole is tapered in an opposite direction to that of the tapered hole, such that a ratio of the outer diameter of the valve seat in a region of the tapered hole to a diameter of the tapered hole is greater in an upstream direction of the fluid flow. By tapering the valve seat in this manner, it is believed that the valve seat is weakened in the region of the tapered hole, such that the tapered hole is able to expand and contract as the pressure of the fluid increases and decreases, respectively. It is also believed that by providing a decreasing wall thickness from a high pressure region to a low pressure region, the tapered hole will flex in a substantially uniform manner. This same function is also achieved in an alternative embodiment by contouring the outer diameter of the valve seat in a step pattern, such that the ratio of the outer diameter of the valve seat to the diameter of the hole is greater in an upstream direction of the fluid flow. Although it is believed to fie preferable, it is not essential to contour the outer surface of file valve seat, and in an alternative embodiment, the outer surface of the valve seat is straight.

In a preferred embodiment, the control force is generated by a spring, having a sufficient length to provide a desired spring constant. In order to avoid buckling of the spring and thereby reduce friction, the spring acts through a recessed spring guide that effectively reduces a length to diameter ratio of the spring, and acts through a ball or sphere that is in contact with a first end of a plunger, the second end of the plunger being in contact with the tapered pin. In a preferred embodiment, the first end of the plunger is radiused so that the spring acts substantially in the center of the plunger via the sphere, and the second end of the plunger is provided with a hard material, for example, tungsten carbide. A first end of the tapered pin that is in contact with the second end of file plunger is ground to a point, so that the force of the spring is transmitted through the plunger to act substantially at the center of the pin, thereby mininizing side loads on the pin and resulting friction.

In an alternative embodiment, a control pressure is generated by an air piston which acts against a first end of a plunger, the second end of the plunger being in contact with the pin via a quantity of hard material.

BRIEF DESCRIPTION

DETAILED DESCRIPTION OF THE INVENTION

Figure 1:
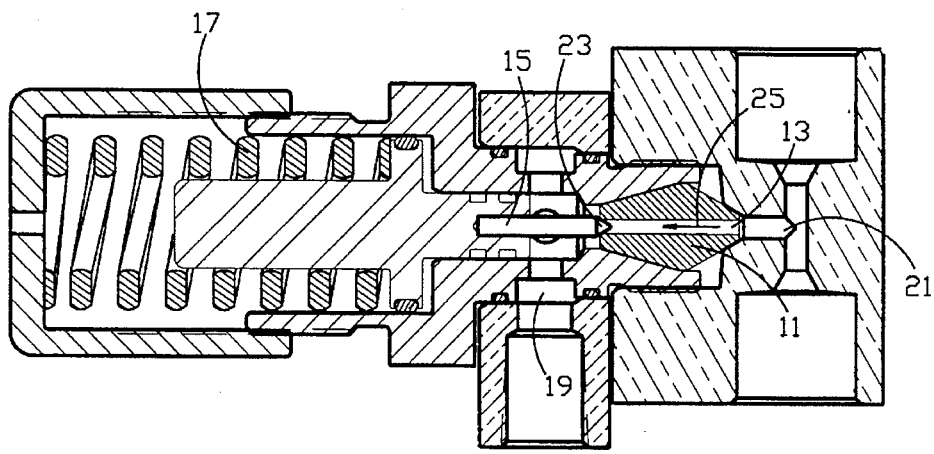
FIG. 1 is a cross-sectional view of a prior art relief valve.

FIG. 1 illustrates a cross-sectional view of a prior art relief valve wherein a valve seat 11 is provided with a conduit 13 in fluid communication with pressurized fluid through inlet 21. Pressurized fluid flows through the valve seat 11 as shown by the directional arrow 25 in FIG. 1, where it comes into contact with pin 15 having a conical end 23 that is held into the valve seat by a spring 17. When the pressure of the fluid is sufficient to overcome the control force generated by spring 17, pin 15 is forced out of the hole or conduit 13, thereby allowing the fluid to pass through the end of the valve seat 11 to outlet 19. When operating at a flow rate of 0.5 gallons per minute and a pressure of 40,000 psi, the useful life of such a valve is typically 100 hours, the valve seat 11 and pin 15 being rapidly damaged by normal operating conditions, resulting in the ultimate failure of the valve.

Figure 2:
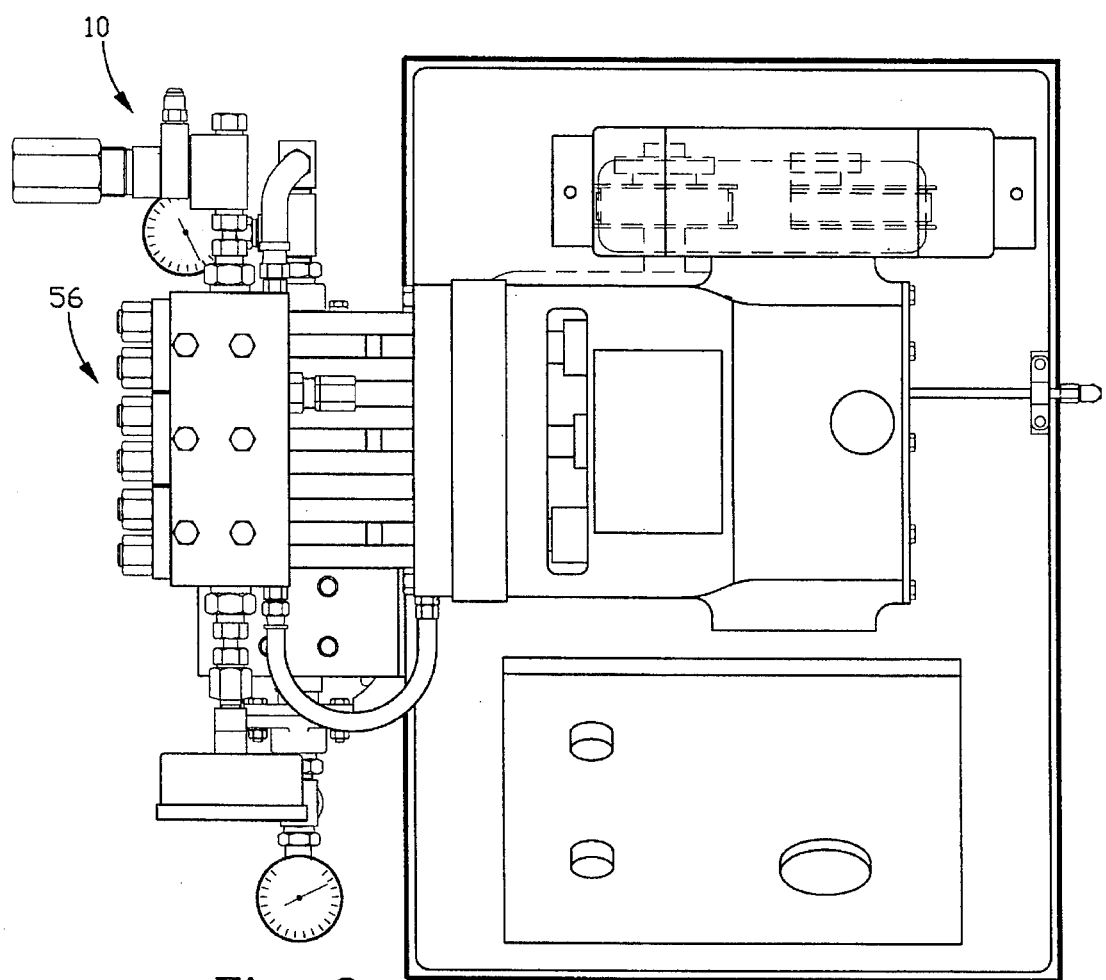
FIG. 2 is a top plan view of a preferred embodiment of the present invention illustrating a high pressure relief valve incorporated into a high pressure pump.

FIG. 2 illustrates a preferred embodiment of the present invention, illustrating a high pressure pump 56 provided with a relief valve 10. The high pressure pump 56 pressurizes fluid, typically water, to pressures up to and beyond 40,000 psi, the pressurized fluid being collected and used by an operator via a tool selected for a particular task. During the normal course of operation, the required flow rate will vary from the maximum the pump can supply to zero, for example, when the operator turns off the tool (not shown) connected to the pump. In the situation where more fluid is pressurized than is demanded by the end user, the relief valve 10 provided in accordance with a preferred embodiment of the present invention operates to vent excess pressurized fluid, thereby preventing a buildup of high pressure which results in damage and stress to parts of the pump and undesirable surges of pressure when the operator again turns the tool on. As compared to the prior art system described above, a relief valve provided in accordance with a preferred embodiment of the present invention may operate upwards of 500 hours, at 40,000 psi.

Figure 3:
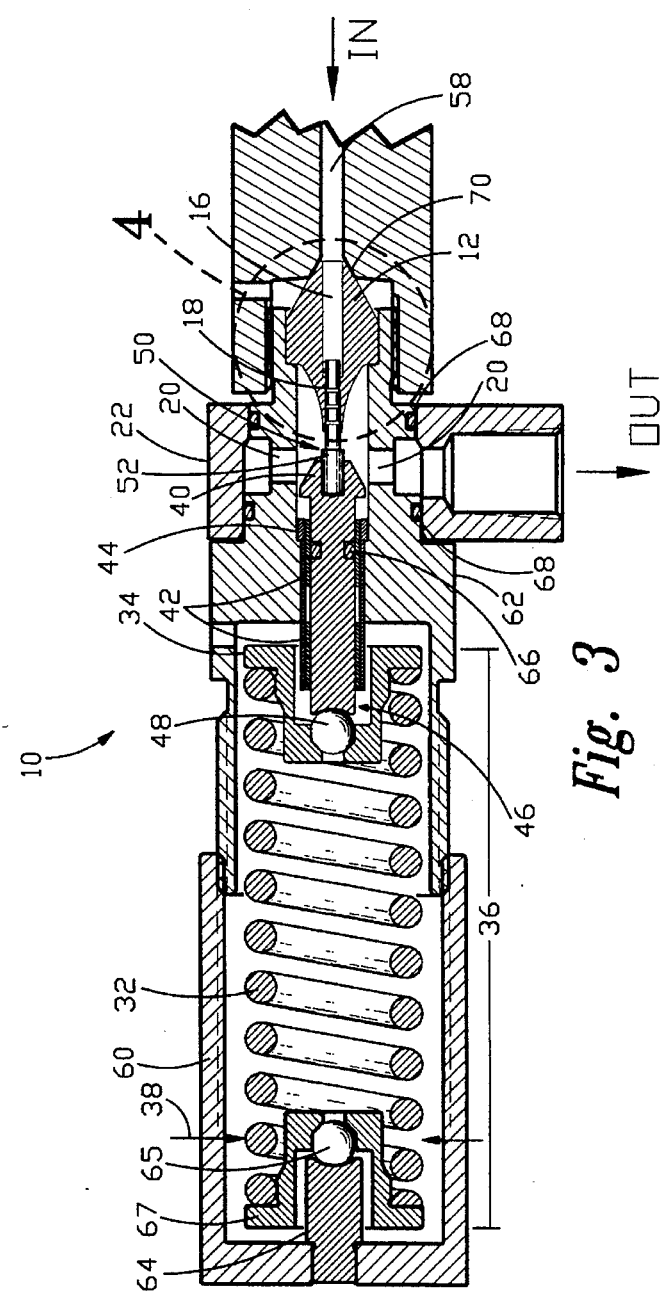
FIG. 3 is a cross-sectional detail view of the high pressure relief valve of FIG. 2.
Figure 6:
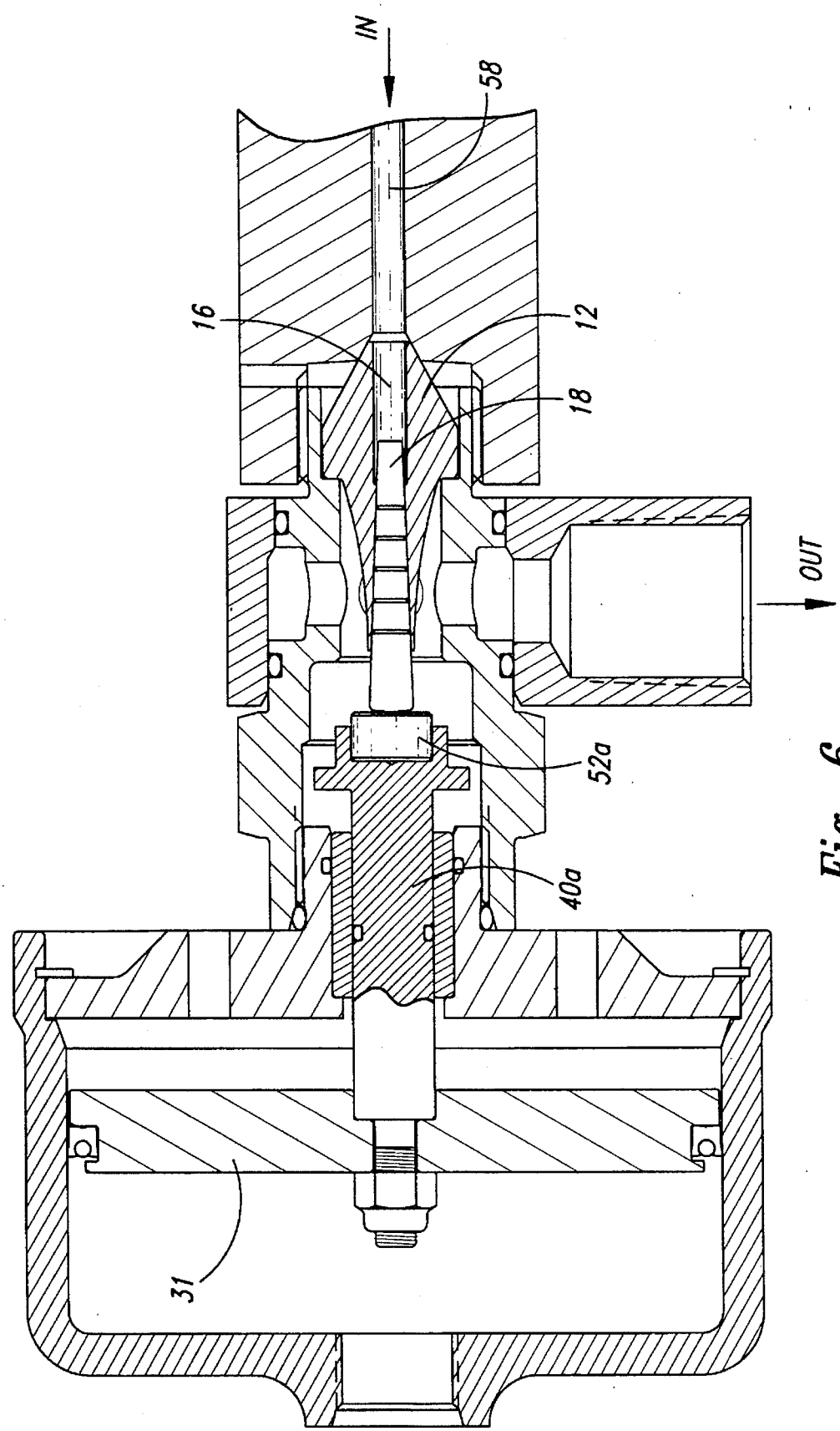
FIG. 6 is a cross-sectional view of an alternative embodiment of a high pressure relief valve provided in accordance with the present invention.

As illustrated in FIG. 3, the high pressure relief valve 10 is provided with a valve seat 12, having a tapered hole 14 and conduit 16 that are in fluid communication with each other, and with fluid pressurized by high pressure pump 56 via inlet port 58. A tapered pin 18 is provided in tapered hole 14, the tapered pin 18 being pushed into the tapered hole 14 by a control force that is generated by spring 32 and acts through plunger 40. As shown in FIGS. 3 and 6 at least 60% of the tapered pin 18 is positioned within the tapered hole 14 to sealingly engage the inner surface of the tapered hole 14 when the tapered pin 18 is seated therein. When the pressure of the fluid increases sufficiently to overcome the control force, the tapered pin 18 is forced to move in the direction of the fluid flow sufficiently to create an annular clearance between the tapered pin and the tapered hole, thereby allowing a volume of pressurized fluid to pass through tapered hole 14 to outlet holes 20 where it is collected by outlet adapter 22. In a preferred embodiment, tapered pin 18 has a range of motion of 50-60 thousandths of an inch.

It is believed that by dissipating the energy of the pressurized fluid over a relatively large surface area created by the tapered pin 18 and tapered hole 14, the energy is dissipated more slowly than in the prior art system illustrated in FIG. 1, thereby minimizing the destructive effects of erosion and cavitation caused by rapid pressure changes.

Figure 5:
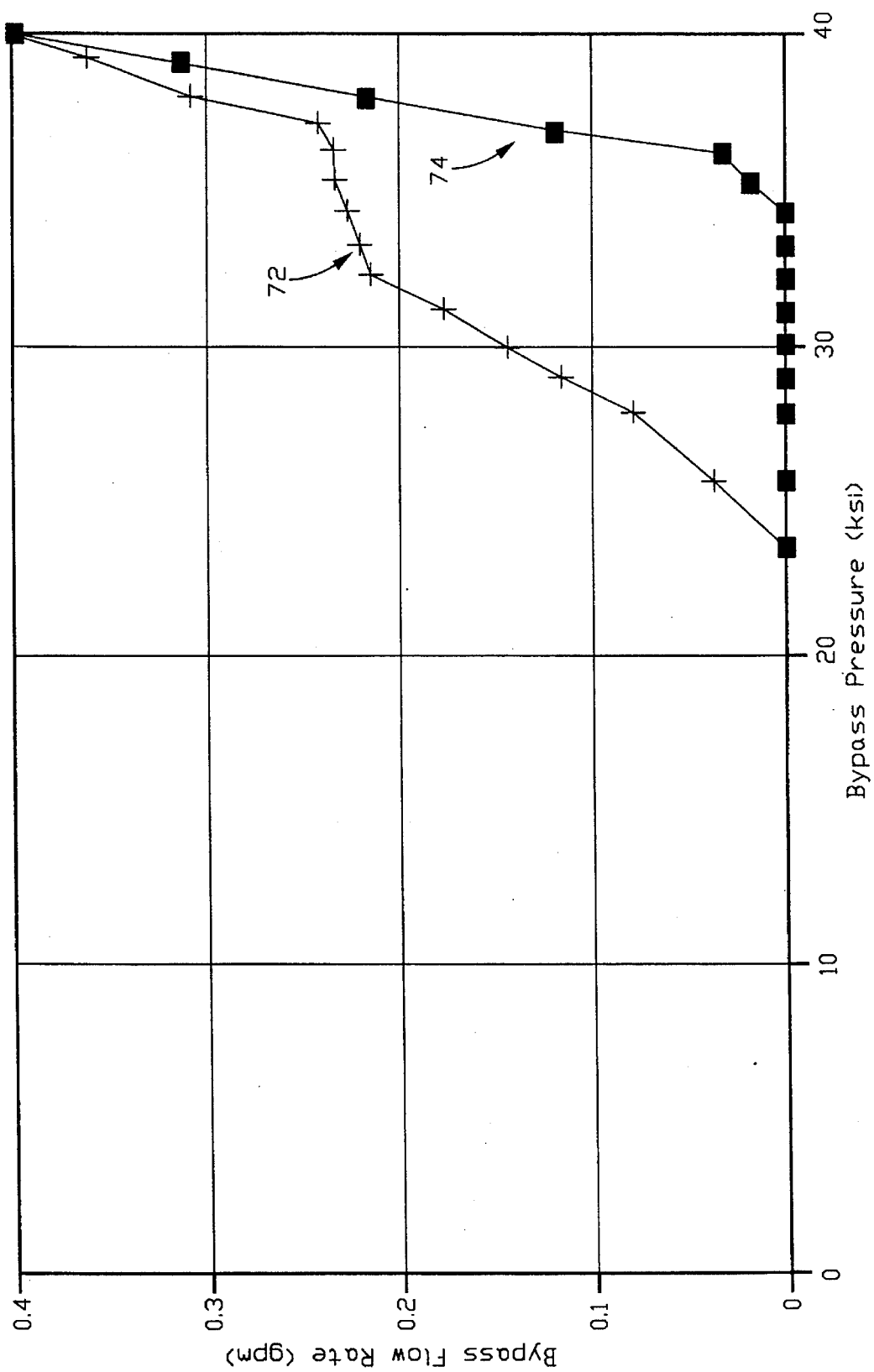
FIG. 5 is a diagram illustrating the effects of providing a high pressure relief valve in accordance with a preferred embodiment of the present invention.

To further enhance the performance of relief valve 10, grooves 24 are provided on a tapered pin. FIG. 5 is a diagram illustrating the effects of adding three grooves to a tapered pin, wherein curve 72 illustrates the change in pressure corresponding to a change in the flow rate past a pin without grooves, and curve 74 illustrates the same operating conditions for the same pin provided with three grooves 24. As may be seen from FIG. 5, a small change in the bypass flow rate across a tapered pin having no grooves results in a large pressure change, while the same change in bypass flow rate across a tapered pin provided with grooves results in a significantly smaller pressure change. It is believed that by providing grooves 24 on tapered pin 18, the fluid flow is maintained in a turbulent condition, thereby resulting in the beneficial behavior illustrated in FIG. 5. In a prefected embodiment, pin 18 is provided with a wear-resistant coating, for example, titanium nitride.

Figure 4:
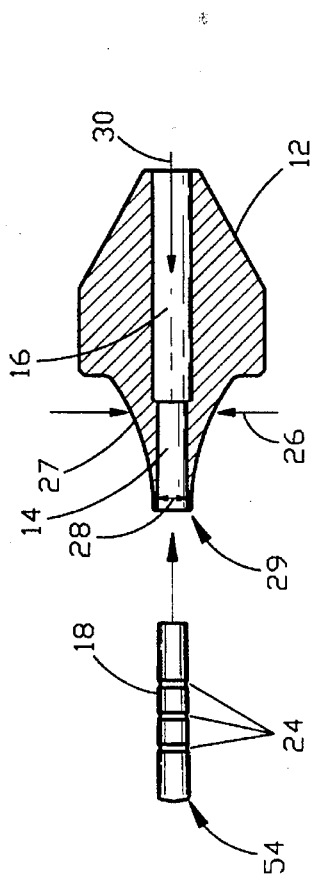
FIG. 4 is a cross-sectional detail view of elements of the high pressure relief valve of FIG. 3.

As illustrated in FIGS. 3 and 4, an outer surface 27 of the valve seat 12 is preferably contoured to keep the stress along the tapered hole 14 substantially constant with a linear change in pressure along the tapered hole 14. More specifically, the outer surface 27 of valve seat 12 proximate to the tapered hole 14 is tapered in an opposite direction to that of tapered hole 14, such that a ratio of the outer diameter 26 of the valve seat proximate tapered hole 14 to a diameter 28 of tapered hole 14 is greater in an upstream direction of fluid flow, the direction of fluid flow being illustrated at reference numeral 30. In a preferred embodiment, the ratio of the outer diameter 26 of the valve seat to the diameter 28 of the tapered hole at the juncture between tapered hole 14 and conduit 16 is approximately 3:1, the wall thickness of the valve seat curving to almost zero at a first end 29 of valve seat 12.

By providing a valve seat 12 in accordance with a preferred embodiment of the present invention, a portion of the valve seat 12 is weakened such that the tapered hole 14 is able to expand and contract as the pressure of the fluid increases and decreases, respectively. For example, when the pump is stopped such that the pressure in conduit 16 drops to zero, the tapered hole 14 collapses on tapered pin 18 thereby preventing tapered pin 18 from jamming into tapered hole 14 which would require unacceptably high pressure to unseat the pin 18 when the pump is subsequently restarted. This also allows the full control force to be supported by a first end 54 of tapered pin 18, thereby allowing tapered pin 18 to protrude outward past the first end 27 of valve seat 12, and allowing tapered pin 18 to feed itself into tapered hole 14 to compensate for wear between the tapered pin and valve seat 12. Manufacturing is also simplified, given that tapered pin 18 is not required to be perfectly matched to valve seat 12.

Figure 7:
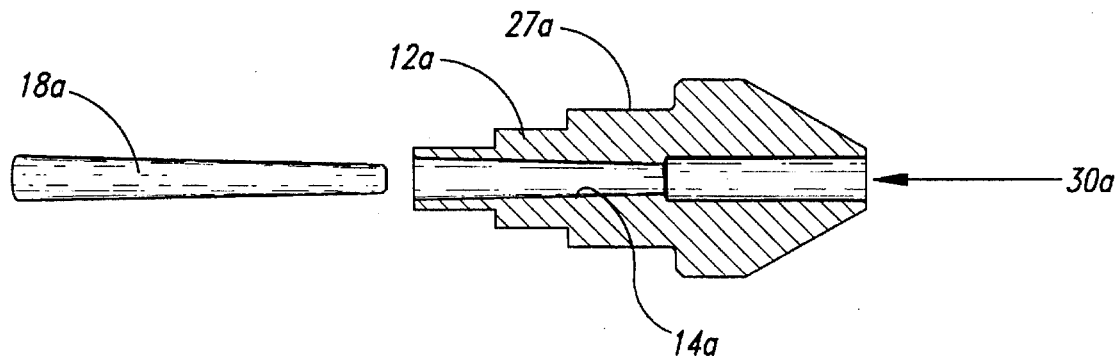
FIG. 7 is an enlarged, cross-sectional view of an alternative embodiment of a valve seat and pin provided in accordance with the present invention.
Figure 8:
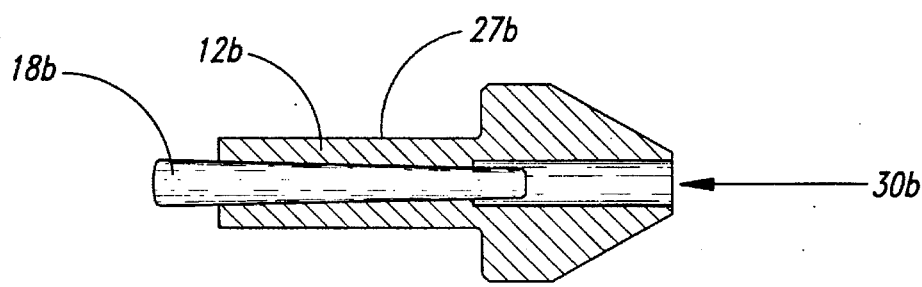
FIG. 8 is an enlarged, cross-sectional view of an alternative embodiment of a valve seat and pin provided in accordance with the present invention.

In an alternative embodiment, as illustrated in FIG. 7, an outer surface 27a of valve seat 12a is stepped, such that a ratio of the outer diameter of the valve seat proximate hole 14a to a diameter of hole 14a is greater in an upstream direction of fluid flow, similar to that described above. Although it is believed to be preffered to contour the outer surface of the valve seat, it is not essential to do so, and the outer surface of the valve seat may therefore be substantially straight, as illustrated in FIG. 8.

Figure 9:
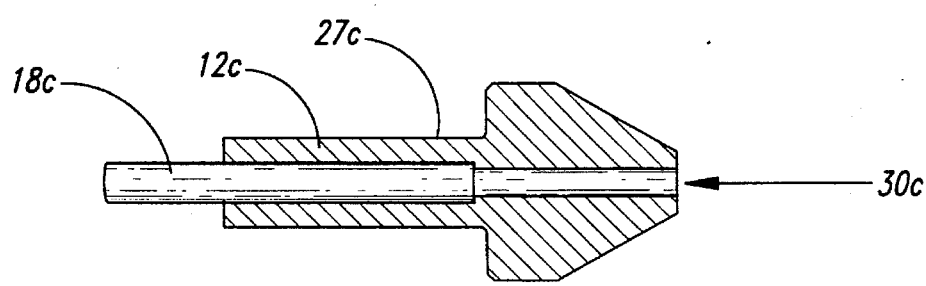
FIG. 9 is an enlarged, cross-sectional view of an alternative embodiment of a valve seat and pin provided in accordance with the present invention.

FIG. 9 illustrates another alternative embodiment, wherein an outer surface 27c of valve seat 12c is substantially straight, and the hole of valve seat 12c and pin 18c are long and straight. It is believed that if pin 18c and the corresponding hole are sufficiently long, the valve will operate in substantially the same way as described above, given that the energy of the pressurized fluid will be dissipated over a relatively large surface area. It will also be understood that the length and diameter of the pin and hole will vary with the selected operating conditions of the pump. It will be understood that the embodiments described herein are for purposes of illustration, and different configurations of the outer surface and inner surface of the valve seat, and the pin, may be combined in a variety of ways.

As noted above and as illustrated in FIG. 3, the control force is generated by spring 32, having a sufficient length to produce a desired spring rate. In a preferred embodiment, spring 32 acts through recessed spring guide 34, which effectively reduces the ratio of a length 36 to diameter 38 of spring 32, thereby preventing the spring from buckling and creating undesirable friction in the system. To further minimize friction in the system, spring 32 acts through ball or sphere 48 which is seated against a first end 46 of plunger 40, the first end 46 being concave and having a larger radius than that of sphere 48, such that the force from spring 32 acts substantially in the center of plunger 40. A second end 50 of plunger 40 is provided with a hard material, for example, tungsten carbide, that contacts a first end 54 of tapered pin 18, the first end of the tapered pin being ground to a point such that the control force acts through plunger 40 substantially in the center of tapered pin 18, thereby avoiding side loading on pin 18 and undesirable friction. (Alternatively, the first end 54 of tapered pin 18 may be radiused.) In a preferred embodiment, the hard material, such as tungsten carbide or ceramics, is provided at the second end 50 of plunger 40 in the form of a tip 52, to minimize manufacturing costs. In alternative embodiments, however, a hard material may be braised to the second end of plunger 40, or plunger 40 may be made completely of a hard material, although this is more expensive, and therefore less practical from a manufacturing standpoint.

The spring force is determined by adjusting nut 60 which is threadedly engaged with valve housing 62, and which acts through pin 64, sphere 65 and spring guide 67, in the same manner as that described above for the ball 48 and spring guide 34 positioned between spring 32 and plunger 40.

In a preferred embodiment, plunger 40 is guided by bushings 42 that are provided in a removable guide tube 44, thereby allowing the bushings to be easily removed and replaced. To minimize leakage of fluid from the system, 0-ring seals 66 and 68 are provided, and valve housing 62 is threaddedly engaged with high pressure port 70.

In an alternative embodiment, the force of the pressurized fluid is balanced against a control pressure acting on an air piston 31, as illustrated in FIG. 6. Air piston 31 acts against a first end of plunger 40a, a second end of plunger 40a acting against the pin via tip 52a, similar to the system described above.

Although dimensions of the system described herein may vary depending on the operating conditions of the pump, in a preferred embodiment, tapered hole 14 is 0.3 inch long, having an inner diameter 28 at its smallest end of 0.08 inch and a taper of 0.25 inch per foot; the tapered pin 18 is 0.5 inch long, having a diameter of 0.078 inch at its smallest end and a taper of 0.25 inch per foot; grooves 24 are spaced 90 thousandths of an inch apart, having a depth of 5 thousandths of an inch; and spring 32 has a free length of 3 inches, a diameters of 1 inch, and a spring rate of 300 pounds per inch. A relief valve 10 provided in accordance with this preferred embodiment may operate up to 500 hours at 40,000 psi, passing up to one half gallon of fluid per minute.

In an alternative embodiment, a relief valve provided in accordance with the present invention is scaled to handle a larger flow. In particular, tapered hole 14 is 1.0 inch long, having an inner diameter 28 at its smallest end of 0.170 inch and a taper of 0.93 inch per foot; and the tapered pin 18 is 1.625 inch long, having a diameter of 0.150 inch at its smallest end and a taper of 0.90 inch per foot. If the pin is provided with grooves, they are spaced 0.1875 inch apart, having a depth of 0.013 inch.

A relief valve for use in a high pressure fluid pump has been shown and described. From the foregoing, it will be appreciated that, although embodiments of the invention have been described herein for purposes of illustration, various modifications may be made without deviating from the spirit and scope of the invention. Thus, the present invention is not limited to the embodiments described herein, but rather is defined by the claims which follow.

We claim:

1. A relief valve comprising:

a valve seat provided with a tapered hole and with a conduit, the tapered hole and the conduit being in fluid communication with each other and with a fluid having a variable pressure; and a tapered pin having a diameter that tapers 0.25–1 inch per foot, at least 60% of the tapered pin being positioned in the tapered hole to sealingly engage an inner surface of the tapered hole when the tapered pin is seated in the tapered hole, the tapered pin being in communication with a control force and with the fluid, such that when the pressure of the fluid is sufficient to overcome the control force, the tapered pin is forced to move sufficiently to create an annular clearance between tapered pin and the tapered hole, thereby allowing a volume of the fluid to pass through the tapered hole to an outlet.

2. The relief valve according to claim 1 wherein a plurality of annular grooves are provided on the circumference of the tapered pin.

3. The relief valve according to claim 1 wherein a portion of the valve seat proximate to the tapered hole is weakened such that the tapered hole is able to expand and contract as the pressure of the fluid increases and decreases.

4. The relief valve according to claim 3 wherein an outer surface of the valve seat proximate to the tapered hole tapers in an opposite direction to that of the tapered hole, such that a ratio of an outer diameter of the valve seat to a diameter of the tapered hole is greater in an upstream direction of the fluid flow.

5. The relief valve according to claim 1 wherein the control force is provided by a spring acting through a recessed spring guide that effectively reduces a length to diameter ratio of the spring and acts through a plunger, the plunger being in contact with the tapered pin.

6. The relief valve according to claim 5 wherein a bushing is provided in a removable guide tube, the plunger passing through the guide tube, thereby reducing friction generated by motion of the plunger.

7. The relief valve according to claim 5 wherein a first end of the plunger is provided with a spherical concave radius and the spring acts through a sphere that is in contact with the first end of the plunger, a second end of the plunger is provided with a hard surface, the second end of the plunger being in contact with a first end of the tapered pin, the first end of the tapered pin being radiused, thereby reducing friction.

8. A relief valve comprising:

a valve seat provided with a tapered hole and with a conduit, the tapered hole and the conduit being in fluid communication with each other and with a fluid having a variable pressure, the valve seat in a region of the tapered hole being weakened such that the tapered hole is able to expand and contract as the pressure of the fluid increases and decreases; and a tapered pin provided in the tapered hole, a plurality of grooves being provided on the tapered pin, the tapered pin being in communication with a control force and with the fluid, such that when the pressure of the fluid is sufficient to overcome the control force, the tapered pin is forced to move sufficiently to create an annular clearance between the tapered pin and the tapered hole, thereby allowing a volume of the fluid to pass through the tapered hole to an outlet.

9. The relief valve according to claim 8 wherein an outer surface of the valve seat in the region of the tapered hole tapers in an opposite direction to that of the tapered hole, such that a ratio of an outer diameter of the valve seat to a diameter of the tapered hole is greater in an upstream direction of the fluid flow.

10. The relief valve according to claim 8 wherein the control force is provided by a spring acting through a recessed spring guide that effectively reduces a length to diameter ratio of the spring and acts through a plunger, the plunger being in contact with the tapered pin.

11. The relief valve according to claim 10 wherein a bushing is provided in a removable guide tube, the plunger passing through the guide tube, thereby reducing friction generated by motion of the plunger.

12. The relief valve according to claim 10 wherein a first end of the plunger is provided with a spherical concave radius and the spring acts through a sphere that is in contact with the first end of the plunger, a second end of the plunger is provided with a hard surface, the second end of the plunger being in contact with a first end of the tapered pin, the first end of the tapered pin being radiused, thereby reducing friction.

13. A pressure relief valve system for a high pressure pump comprising:

a high pressure fluid pump provided with a relief valve having a valve seat provided with a tapered hole and with a conduit, the tapered hole and the conduit being in fluid communication with each other and with a fluid that is pressurized by the high pressure fluid pump, a pressure of the fluid increasing and decreasing with changes in operating conditions of the pump; and a tapered pin having a diameter that tapers of 0.25–1 inch per foot, at least 60% of the tapered pin being positioned in the tapered hole to sealingly engage an inner surface of the tapered hole when the tapered pin is seated in the tapered hole, the tapered pin being in communication with a control force and with the fluid, such that when the pressure of the fluid is sufficient to overcome the control force, the tapered pin is forced to move sufficiently to create an annular clearance between the tapered pin and the tapered hole, thereby allowing a volume of the fluid to pass through the tapered hole to an outlet.

14. The relief valve according to claim 13 wherein a plurality of annular grooves are provided on the circumference of the tapered pin.

15. The relief valve according to claim 13 wherein the valve seat proximate to the tapered hole is weakened such that the tapered hole is able to expand and contract as the pressure of the fluid increases and decreases.

16. A relief valve comprising:

a valve seat provide with a tapered hole and with a conduit, the tapered hole and a conduit being in fluid communication with each other and with a fluid having a variable pressure; and a tapered pin having a diameter that tapers 0.25–1 inch per foot, at least 60% of the tapered pin being positioned in the tapered hole to sealingly engage an inner surface of the tapered hole when the tapered pin is seated in the tapered hole, the tapered pin being in communication with a control pressure and with the fluid, such that when the pressure of the fluid is sufficient to overcome the control pressure, the tapered pin is forced to move sufficiently to create an annular clearance between the tapered pin and in the tapered hole, thereby allowing a volume of the fluid to pass through the tapered hole to an outlet.

17. The relief valve according to claim 16 wherein the control pressure acts upon an air piston that acts through a plunger, the plunger being in contact with the tapered pin.

18. A pressure relief valve system for a high pressure pump comprising:

a high pressure fluid pump provided with a relief valve having a valve seat provided with a tapered hole and with a conduit, the tapered hole and the conduit being in fluid communication with each other and with a fluid that is pressurized by the high pressure fluid pump, a pressure of the fluid increasing and decreasing with changes in operating conditions of the pump; and a tapered pin having a diameter that tapers 0.25–1 inch per foot, at least 60% of the tapered pin being positioned in the tapered hole to sealingly engage an inner surface of the tapered hole when the tapered pin is seated in the tapered hole, the tapered pin being in communication with a control pressure and with the fluid, such that when the pressure of the fluid is sufficient to overcome the control pressure, the tapered pin is forced to move sufficiently to create an annular clearance between the tapered pin and the tapered hole, thereby allowing a volume of the fluid to pass through the tapered hole to an outlet.

19. A relief valve comprising:

a valve seat provided with a tapered hole and with a conduit, the tapered hole and the conduit being in fluid communication with each other and with a fluid having a variable pressure, a portion of the valve seat proximate to the tapered hole being weakened such that the tapered hole is able to expand and contract as the pressure of the fluid increases and decreases; and a tapered pin provided in the tapered hole, the tapered pin being in communication with a control force and with the fluid, such that when the pressure of the fluid is sufficient to overcome the control force, the tapered pin is forced to move sufficiently to create an annular clearance between the tapered pin and the tapered hole, thereby allowing a volume of the fluid to pass through the tapered hole to an outlet.

20. The relief valve according to claim 19 wherein an outer surface of the valve seat proximate to the tapered hole tapers in an opposite direction to that of the tapered hole, such that a ratio of an outer diameter of the valve seat to a diameter of the tapered hole is greater in an upstream direction of the fluid flow.

21. A relief valve comprising:

a valve seat provided with a tapered hole and with a conduit, the tapered hole and the conduit being in fluid communication with each other and with a fluid having a variable pressure; and a tapered pin provided in the tapered hole, the tapered pin being in communication with a control force and with the fluid, such that when the pressure of the fluid is sufficient to overcome the control force, the tapered pin is forced to move sufficiently to create an annular clearance between the tapered pin and the tapered hole, thereby allowing a volume of the fluid to pass through the tapered hole to an outlet, and wherein the control force is provided by a spring acting through a recessed spring guide that effectively reduces a length-to-diameter ratio of the spring and acts through a plunger, the plunger being in contact with the tapered pin and passing through a removable guide tube, a bushing being provided in the removable guide tube, thereby reducing friction generated by motion of the plunger.

22. A relief valve comprising:

a valve seat provided with a tapered hole and with a conduit, the tapered hole and the conduit being in fluid communication with each other and with a fluid having a variable pressure; and a tapered pin provided in the tapered hole, the tapered pin being in communication with a control force and with the fluid, such that when the pressure of the fluid is sufficient to overcome the control force, the tapered pin is forced to move sufficiently to create an annular clearance between the tapered pin and the tapered hole, thereby allowing a volume of the fluid to pass through the tapered hole to an outlet, the control force being provided through a spring acting through a recessed spring guide that effectively reduces a length-to-diameter ratio of the spring and acts through a plunger, and wherein a first end of the plunger is provided with a spherical concave radius and the spring acts through a sphere that is in contact with the first end of the plunger, a second end of the plunger being provided with a hard surface, the second end of the plunger being in contact with a first end of the tapered pin, the first end of the tapered pin being radiused, thereby reducing friction.

23. A pressure relief valve system for a high pressure pump comprising:

a high pressure fluid pump provided with a relief valve having a valve seat provided with a tapered hole and with a conduit, the tapered hole and the conduit being in fluid communication with each other and with a fluid that is pressurized by the high pressure fluid pump, a pressure of the fluid increasing and decreasing with changes in operating conditions of the pump, the valve seat proximate to the tapered hole being weakened such that the tapered hole is able to expand and contract as the pressure of the fluid increases and decreases; and a tapered pin provided in the tapered hole, the tapered pin being in communication with a control force and with the fluid, such that when the pressure of the fluid is sufficient to overcome the control force, the tapered pin is forced to move sufficiently to create an annular clearance between the tapered pin and the tapered hole, thereby allowing a volume of the fluid to pass through the tapered hole to an outlet.

24. A relief valve comprising:

a valve seat provided with a tapered hole and with a conduit, the tapered hole and the conduit being in fluid communication with each other and with fluid having a variable pressure; and a tapered pin having a diameter that tapers 0.25–1 inch per foot and that is provided in the tapered hole, a plurality of annular grooves being provided on the circumferential of the tapered pin, the tapered pin being in communication with a control force and with the fluid, such that when the pressure of the fluid is sufficient to overcome the control force, the tapered pin is forced to move sufficiently to create an annular clearance between the tapered pin and the tapered hole, thereby allowing a volume of the fluid to pass through the tapered hole to an outlet.

25. A pressure relief valve system for a high pressure pump comprising:

a high pressure fluid pump provided with a relief valve having a valve seat provided with a tapered hole and with a conduit, the tapered hole and the conduit being in fluid communication with each other and with a fluid that is pressurized by the high pressure fluid pump, a pressure of the fluid increasing and decreasing with changes in operating conditions of the pump; and a tapered pin having a diameter that tapers 0.25–1 inch per foot and that is provided in the tapered hole, a plurality of annular grooves being provided on the circumference of the tapered pin, the tapered pin being in communication with a control force and with the fluid, such that when the pressure of the fluid is sufficient to overcome the control force, the tapered pin is force to move sufficiently to create an annular clearance between the tapered pin and the tapered hole, thereby allowing a volume of the fluid to pass through the tapered hole to an outlet.

* * * * *

UNITED STATES PATENT AND TRADEMARK OFFICE
CERTIFICATE OF CORRECTION

PATENT NO.    :   5,564,469
DATED         :   October 15, 1996
INVENTOR(S)   :   Olivier L. Tremoulet, Jr. et al.

It is certified that error appears in the above identified patent and that said Letters Patent is hereby corrected as shown below:

In column 6, claim 1, line 58, following "between" please insert --the--.

In column 8, claim 16, line 26, please delete "provide" and insert therefor --provided--.

In column 8, claim 16, line 27, please delete "a" and insert therefor --the--.

In column 8, claim 16, line 39, please delete "in".

In column 10, claim 24, line 27, following "with" (2nd. occ.) insert --a--.

In column 10, claim 24, lines 31-32, please delete "circumferential" and insert therefor --circumference--.

In column 10, claim 25, line 56, please delete the second instance of "force" and insert therefor --forced--.

Signed and Sealed this

Twenty-second Day of April, 1997

Attest:

BRUCE LEHMAN

*Commissioner of Patents and Trademarks*

*Attesting Officer*